United States Patent
Wang

(10) Patent No.: US 8,175,177 B2
(45) Date of Patent: May 8, 2012

(54) PEAK TO AVERAGE POWER RATIO REDUCTION

(75) Inventor: Shu Wang, San Diego, CA (US)

(73) Assignee: LG Electronics Inc., Seoul (KR)

( * ) Notice: Subject to any disclaimer, the term of this patent is extended or adjusted under 35 U.S.C. 154(b) by 732 days.

(21) Appl. No.: 12/191,227

(22) Filed: Aug. 13, 2008

(65) Prior Publication Data

US 2009/0052577 A1    Feb. 26, 2009

Related U.S. Application Data

(60) Provisional application No. 60/955,835, filed on Aug. 14, 2007, provisional application No. 60/955,838, filed on Aug. 14, 2007.

(51) Int. Cl.
    *H04L 27/28* (2006.01)
(52) U.S. Cl. ...................................... 375/260
(58) Field of Classification Search ............ 375/260, 375/265, 267, 295–296, 299; 370/208, 210; 455/101, 103, 114.2, 114.3
    See application file for complete search history.

(56) References Cited

U.S. PATENT DOCUMENTS

| | | | | |
|---|---|---|---|---|
| 7,002,904 B2 * | 2/2006 | Jung | ............... | 370/210 |
| 7,269,782 B2 * | 9/2007 | Kim et al. | ............... | 714/784 |
| 7,292,639 B1 * | 11/2007 | Demirekler et al. | ............... | 375/260 |
| 7,342,978 B2 * | 3/2008 | Feng et al. | ............... | 375/295 |
| 7,570,684 B2 * | 8/2009 | Zhang et al. | ............... | 375/145 |
| 7,646,820 B2 * | 1/2010 | Shen et al. | ............... | 375/260 |
| 7,664,193 B2 * | 2/2010 | Jalali et al. | ............... | 375/267 |
| 7,675,982 B2 * | 3/2010 | Zhang et al. | ............... | 375/260 |
| 7,715,492 B2 * | 5/2010 | Seki | ............... | 375/295 |
| 2005/0270968 A1 | 12/2005 | Feng et al. | | |
| 2007/0115795 A1 * | 5/2007 | Gore et al. | ............... | 370/203 |
| 2007/0115864 A1 * | 5/2007 | Bar-Ness et al. | ............... | 370/278 |
| 2007/0121737 A1 * | 5/2007 | Yoshii et al. | ............... | 375/260 |
| 2007/0165730 A1 * | 7/2007 | Whinnett et al. | ............... | 375/260 |
| 2007/0291860 A1 * | 12/2007 | Wang et al. | ............... | 375/260 |
| 2010/0177832 A1 * | 7/2010 | Baliga et al. | ............... | 375/260 |

FOREIGN PATENT DOCUMENTS

WO    2007/081173    7/2007

OTHER PUBLICATIONS

S.H. Han, et al., "An Overview of Peak-to-Average Power Ration Reduction Techniques for Multicarrier Transmission," IEEE Wireless Communications, vol. 12, No. 2, Apr. 2005, pp. 56-65.
G.L. Stuber, et al., "Broadband MIMO-OFDM Wireless Communications," Proceedings of the IEEE, vol. 92, No. 2, Feb. 2004, pp. 271-294.
H. Reddy, et al., "Space-Time Coded OFDM with Low PAPR," IEEE Global Telecommunications Conference, Dec. 1, 2003, pp. 799-803.
Y. Zhang, et al., "Future Transmitter/Receiver Diversity Schemes in Broadcast Wireless Networks," IEEE Communications Magazine, Oct. 2006, pp. 120-127.

* cited by examiner

*Primary Examiner* — Khanh C Tran
(74) *Attorney, Agent, or Firm* — Lee, Hong, Degerman, Kang & Waimey

(57) ABSTRACT

The present invention is related to a method for reducing a peak to average power ratio (PAPR) of a signal in a wireless communication system. PAPR is reduced by modulating a data stream into a plurality of symbols, dividing the plurality of symbols into symbol groups, applying a Fourier transform to each of the symbol groups, applying a delay to at least one of the transformed symbol groups, and calculating a peak to average power ratio of the symbol groups.

14 Claims, 11 Drawing Sheets

PEAK TO AVERAGE POWER RATIO REDUCTION

CROSS-REFERENCE TO RELATED APPLICATIONS

Pursuant to 35 U.S.C. §119, this application claims the benefit of earlier filing date and right of priority to U.S. Provisional Application No. 60/955,835, filed on Aug. 14, 2007 and U.S. Provisional Application No. 60/955,838, filed on Aug. 14, 2007, the contents of which are hereby incorporated by reference herein in their entirety.

FIELD OF THE INVENTION

The present invention relates generally to mobile communication networks, and more particularly to a system and method for reducing a peak to average power ratio of a signal in a wireless communication system.

BACKGROUND OF THE INVENTION

Peak-to-average power ratio (PAPR) issues are problems associated with high power peaks occurring in signals to be processed. They are historical problems in wireless system design and critically affect broadband communication. PAPR may be represented by the Equation (1), wherein $\max|s(t)|^2$ represents a highest peak of a signal, $E|s(t)|^2$ represents an average power of the signal and L represents a number of subcarriers.

$$PAPR = \frac{\max|s(t)|^2}{E|s(t)|^2} \approx O(L) \qquad (1)$$

Orthogonal frequency division multiplexing (OFDM) is a multi-carrier signal generation method whereby data are sent simultaneously over N equally spaced carrier frequencies using Fourier transform techniques for modulation and demodulation. By proper choice of frequencies, OFDM can squeeze multiple modulated carriers into a prescribed band while preserving orthogonality to eliminate inter-carrier interference (ICI) or inter-symbol interference (ISI). This approach has been proposed or adopted for many wireless applications including digital audio broadcasting, digital terrestrial television broadcasting wireless LANs and high-speed cellular data. Techniques for implementing OFDM are well known.

However, a significant disadvantage of employing OFDM for wireless applications is the potentially large peak-to-average power ratio (PAPR) characteristic of a multicarrier signal with a large number of subchannels.

For example, a baseband OFDM signal with N subchannels has a PAPR of $N^2/N=N$, for N=256, PAPR=24 dB. When passed through a nonlinear device, such as a transmit power amplifier, the signal may suffer significant spectral spreading, interchannel interference, in-band distortion, orthogonal loss and increased bit error rate (BER). With the increased interest in OFDM for wireless applications, reducing the PAPR is necessary for implementing OFDM.

For wireless applications, efficient power amplification is required to provide adequate area coverage and to minimize battery consumption. A conventional solution to the PAPR problem in OFDM systems is to use a linear amplifier. However, the linear amplifier is inefficient and is operated with large backoff from its peak power limit to reduce the distortion introduced by clipping, further reducing efficiency. Also, amplifier backoff attenuates the transmitted signals, thereby placing greater demands on receiver sensitivity.

Thus, what is needed is a method and apparatus for reducing PAPR in an OFDM signal which reduces the PAPR substantially without a significant decrease in system efficiency or an increase in system cost.

SUMMARY OF THE INVENTION

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment of the present invention, a method for reducing a peak to average power ratio of a signal in a wireless communication system comprises modulating a data stream into a plurality of symbols, dividing the plurality of symbols into symbol groups, applying a Fourier transform to each of the symbol groups, applying a delay to at least one of the transformed symbol groups, and calculating a peak to average power ratio of the symbol groups.

The method may further comprise combining the symbol groups prior to calculating the peak to average power ratio of the symbol groups or combining the symbol groups after calculating the peak to average power ratio of the symbol groups. Preferably, the delay is a cyclic delay.

In one aspect of the invention, the method further comprises determining whether the peak to average power ratio of the symbol groups is below a predetermined value, reapplying a delay to at least one of the transformed symbol groups if the peak to average power ratio of the symbol groups is not below the predetermined value, recombining all symbol groups, and recalculating the peak to average power ratio of the recombined symbol groups, wherein the determining, reapplying, recombining and recalculating steps are repeated until the peak to average power ratio of the recombined symbol groups is below the predetermined value. Preferably, the delay reapplied to at least one transformed symbol group comprises a delay value different from an original delay value.

In another aspect of the invention, the method further comprises adding predefined symbols to at least one of the transformed symbol groups prior to, or after, applying the delay to at least one of the transformed symbol groups.

In a further aspect of the invention, the method further comprises power and phase adjusting each of the symbol groups prior to transforming each of the symbol groups.

In accordance with another embodiment of the present invention, a method for reducing a peak to average power ratio of a signal in a wireless communication system comprises modulating a data stream into a plurality of symbols, mapping each of the plurality of symbols to an associated subcarrier, applying a Fourier transform to each of the mapped symbols, calculating a peak to average power ratio of the transformed symbols, determining whether the peak to average power ratio of the transformed symbols is below a predetermined value, remapping each of the plurality of symbols to an associated subcarrier if the peak to average power ratio of the transformed symbols is not below a predetermined value, reapplying a Fourier transform to each of the remapped symbols, and recalculating the peak to average power ratio of the retransformed symbols, wherein the determining, remapping, retransforming and recalculating steps are repeated until the peak to average power ratio of the retransformed symbols is below the predetermined value.

In accordance with another embodiment of the present invention a method for reducing a peak to average power ratio of a signal in a wireless communication system comprises modulating a data stream into a plurality of symbols, generating a plurality of symbol-to-subcarrier groups by mapping each of the plurality of symbols to an associated subcarrier using a plurality of symbol-to-subcarrier mapping schemes, transforming each of the plurality of symbol-to-subcarrier groups, calculating a peak to average power ratio of each of the transformed symbol-to-subcarrier groups, and selecting the transformed symbol-to-subcarrier group that achieves a predefined condition. Preferably, the predefined condition comprises a lowest peak to average power ratio of the transformed symbol-to-subcarrier groups.

In accordance with another embodiment of the present invention a method for efficiently transmitting a signal in a wireless communication system comprises modulating a data stream into a plurality of symbols, dividing the plurality of symbols into symbol groups, block coding each of the symbol groups, adjusting a power of at least one block coded symbol group, and applying a Fourier a transform to the block coded symbol groups.

Preferably, the method further comprises differentiating at least one block coded symbol group from another block coded symbol group prior to adjusting the power of the at least one block coded symbol group, wherein the differentiating comprises applying additional block coding to at least one block coded symbol group.

In one aspect of the invention, the method further comprises differing a phase of at least one block coded symbol group prior to applying the Fourier transform to the block coded symbol groups.

In another aspect of the invention, the method further comprises calculating a peak to average power ratio of the transformed block coded symbol groups, determining whether the peak to average power ratio is below a predetermined value, re-adjusting the power of the at least one block coded symbol group if the peak to average power ratio is not below the predetermined value, reapplying the Fourier transform to the block coded symbol groups, and recalculating the peak to average power ratio of the retransformed blocked coded symbol groups, wherein the determining, re-adjusting, retransforming and recalculating steps are repeated until the peak to average power ratio of the retransformed coded symbol groups is below the predetermined value. Preferably, the symbol groups are block coded using an Alamouti scheme.

In accordance with another embodiment of the present invention a method for reducing a peak to average power ratio of a signal in a wireless communication system comprises modulating a data stream into a plurality of symbols, applying a Fourier transform to the plurality of symbols, dividing the transformed plurality of symbols into symbol groups, applying a delay to at least one of the transformed (IFFT or IDFT) symbol groups, and calculating a peak to average power ratio of the symbol groups.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to reducing a peak to average power ratio (PAPR) of a signal in a wireless communication system.

Figure 1:
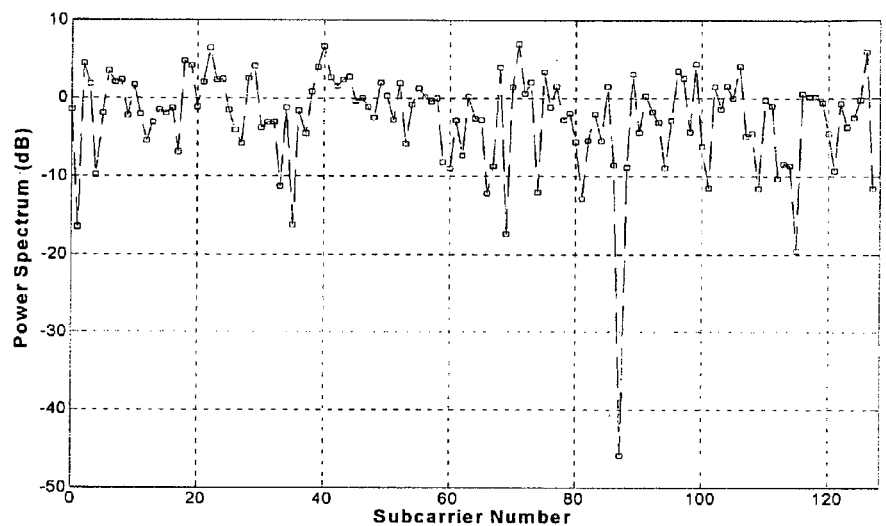
FIG. 1 illustrates an example of an OFDM signal in accordance with the present invention.
Figure 2:
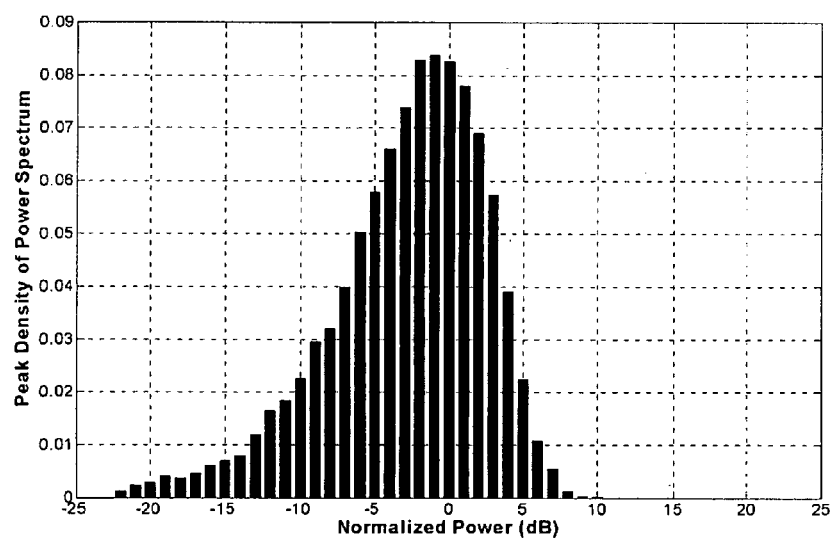
FIG. 2 illustrates a distribution between a peak power and an average power of an OFDM signal in accordance with the present invention.
Figure 3:
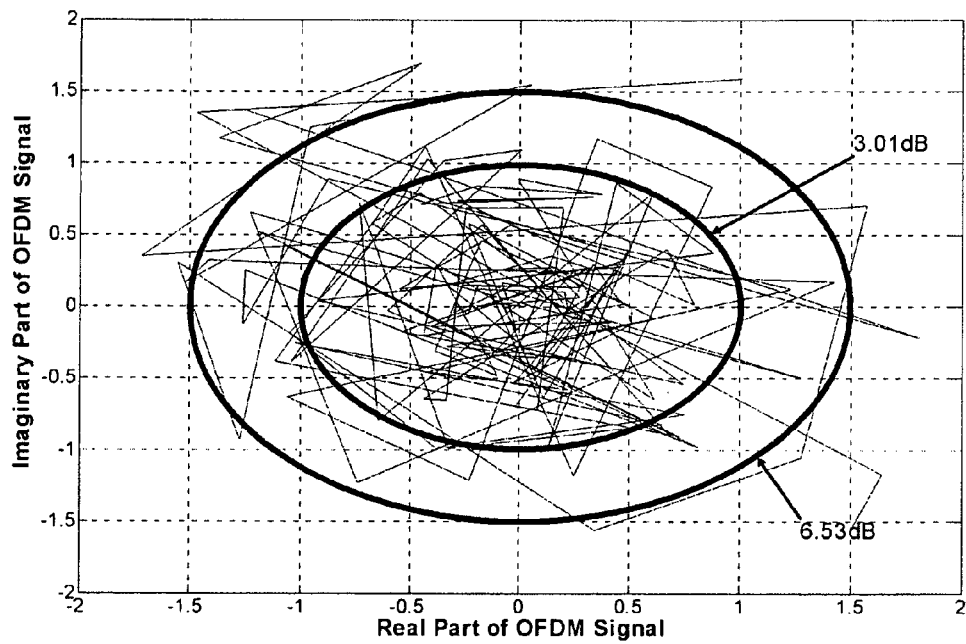
FIG. 3 illustrates a plot of a real part of an OFDM signal versus an imaginary part of the OFDM signal in accordance with the present invention.

FIG. 1 illustrates an example of an OFDM signal with a signal length L=128. FIG. 2 illustrates a distribution between a peak power and an average power of an OFDM signal having a signal length L=128. FIG. 3 illustrates a plot of a real part of an OFDM signal having a length L=128 versus an imaginary part of the OFDM signal. Static properties of PAPR can be described by a complementary cumulative distribution function (CCDF). In accordance with the present invention, a frequency-domain symbol may be complex Gaussian distributed. Thus, when the number of subcarriers L become large, the instantaneous power of each OFDM signal chip can be modeled by a chi-distributed signal with two degrees of freedom.

In accordance with the present invention, several solutions exist to reduce the PAPR. Examples include clipping, filtering, partial transmit signaling, tone reservation, coding, selective mapping and constellation optimization.

In clipping, the OFDM signal may be deliberately clipped before amplification. Clipping provides a good PAPR but at the expense of performance degradation. Specifically, in-band distortion is mostly negligible, but out-of-band distortion is serious. In filtering, use of a time-invariant linear filter results in less peak regrowth and lower PAPR than a discrete Fourier transform (DFT) filter in general if there is no spectral masking.

In partial transmit signaling (PTS), each input data block comprising a set of subcarrier coefficients is partitioned into disjoint sub-blocks, which are then combined to minimize the PAPR. Specifically, each subcarrier coefficient is multiplied by a weighting coefficient, or phase factor. The phase factors are chosen to minimize the PAPR of the transmitted signal.

In tone reservation (TR), anti-peak signals are inserted into unused or reserved subcarriers. The objective is to find a time-domain signal to be added into the original time-domain signal such that the PAPR is reduced.

In coding, a desired data sequence is embedded in a larger sequence and only a subset of all possible sequences are used, specifically those with low peak powers. The object is to select a code with less PAPR. However, constructing codes with both a low PAPR and short Hamming distance may be difficult.

In selective mapping (SLM), M statistically independent sequences are generated from the same information and the sequence with the lowest PAPR is chosen for transmission. To recover the data, the receiver preferably knows which sequence has been used to multiply the data.

In constellation optimization, the object is to increase a constellation size so that each of the points in an original basic constellation can be mapped into several equivalent points in an expanded constellation. Tone injection (TI) and active constellation extension (ACE) are methods related to constellation optimization.

Figure 4:
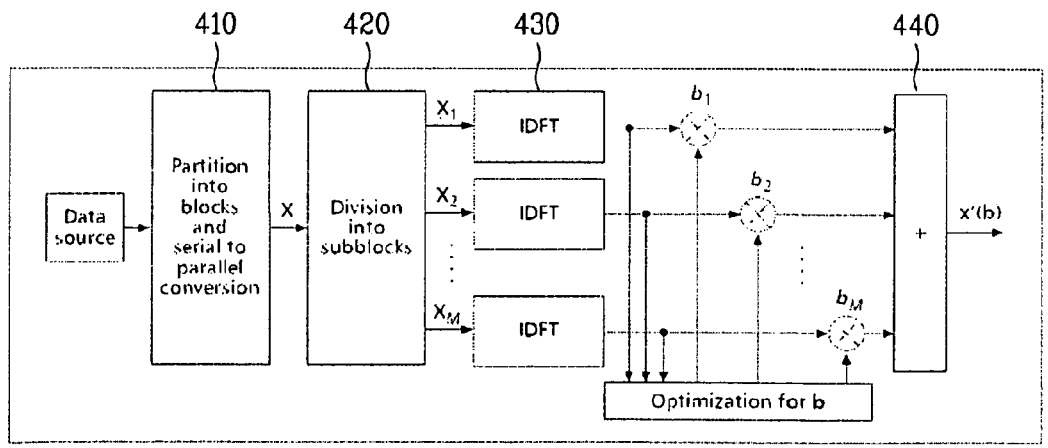
FIG. 4 illustrates a partial transmit signaling (PTS) method for reducing PAPR of a signal in accordance with one embodiment of the present invention.

FIG. 4 illustrates a partial transmit signaling (PTS) method for reducing PAPR of a signal. As shown in FIG. 4, a data signal is partitioned into data blocks and may be converted from a serial stream to a parallel stream (410). A data block may comprise a set of subcarrier coefficients. Preferably, each data block is divided into an M number of sub-blocks or clusters (420). Each sub-block is then converted into a time-domain sequence using a Fourier transform, such as an Inverse Discrete Fourier Transform (IDFT) or Inverse Fast Fourier Transform (IFFT) (430). The transformed sequences may then be combined to minimize the PAPR (440). Preferably, each transformed sequence may be multiplied by a weighting coefficient or phase factor ($b_1, b_2, \ldots, b_m$) prior to being combined.

Figure 5:
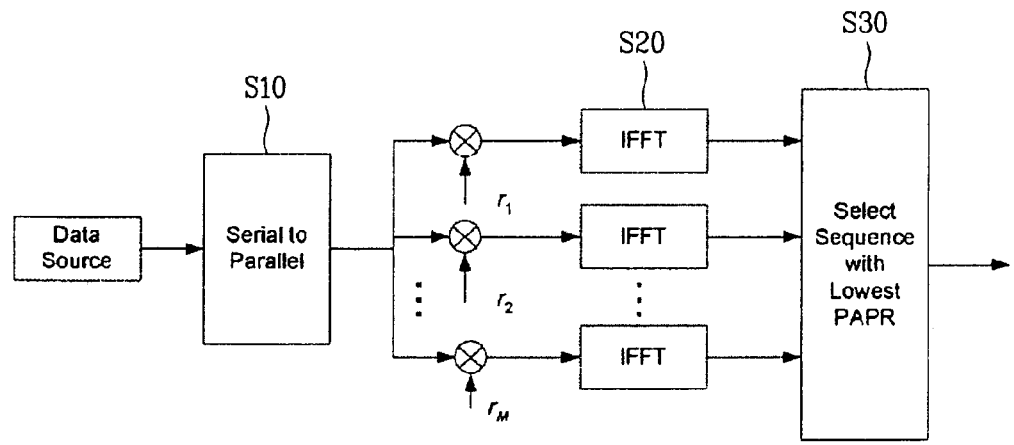
FIG. 5 illustrates a selective mapping method for reducing PAPR of a signal in accordance with one embodiment of the present invention.

FIG. 5 illustrates a selective mapping method for reducing PAPR of a signal. Preferably, the selective mapping method generates M statistically independent transformed sequences for each data block and transmits the transformed sequence with the lowest PAPR. As shown in FIG. 5, a data signal is converted from a serial stream to a parallel stream of M data blocks (510). Each data block is then multiplied by a respectively independent sequence ($r_1, r_2, \ldots, r_m$). Afterward, the sequences are converted into time-domain sequences using Fourier transforms (e.g., IDFTs or IFFTs) (520). The transformed sequence with the lowest PAPR may then be selected for transmission (530). In accordance with the selective mapping method, a receiver of the selected transformed sequence may be required to attain information related to the identity of the sequence used to multiply the data block of the transformed sequence in order to recover the data received.

Figure 6:
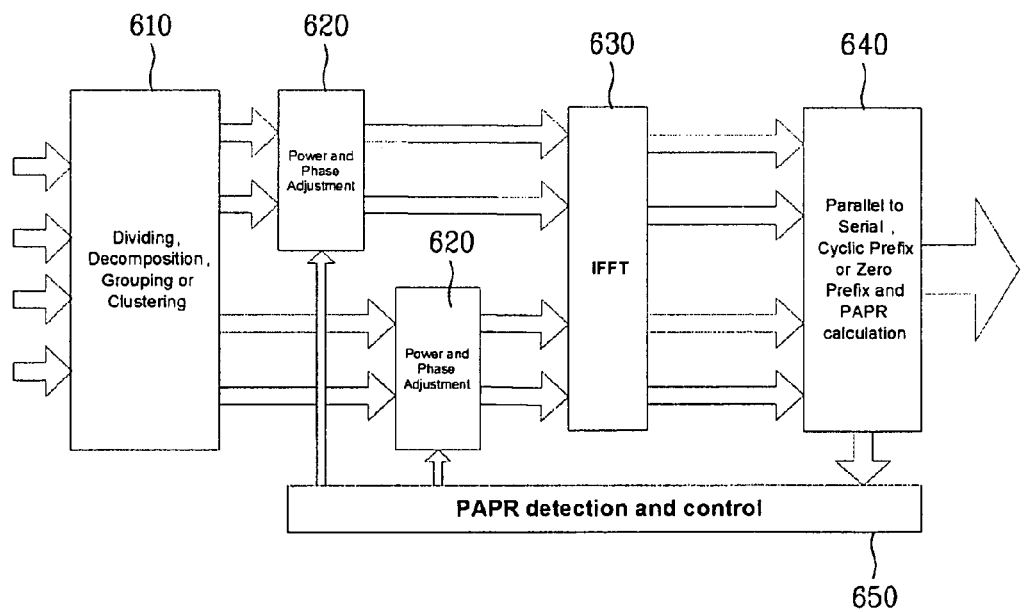
FIG. 6 illustrates a method for reducing PAPR of a signal with group-based signal adjustment in a frequency domain in accordance with one embodiment of the present invention.

FIG. 6 illustrates a method for reducing PAPR of a signal with group-based signal adjustment in a frequency domain in accordance with one embodiment of the present invention. Referring to FIG. 6, a data stream is modulated into a plurality of symbols. The plurality of symbols are then divided, decomposed, grouped or clustered into symbol groups (610). The symbol groups may then be adjusted for power and phase (620). Thereafter, a Fourier transform (e.g., IFFT or IDFT) is applied to each of the symbol groups (630). As a result, a peak to average power ratio (PAPR) of the symbol groups may be calculated (640).

Still referring to FIG. 6, after calculating the PAPR of the symbol groups, it is determined whether the PAPR is below a predetermined value (650). If so, then a feedback operation of the method may not be necessary because the PAPR is below a threshold. However, if the PAPR of the symbol groups is not below the predetermined value, then the feedback operation will be performed to reduce the PAPR.

Preferably, upon the feedback operation being implemented, the symbol groups may be readjusted for power and phase (620). Thereafter, a Fourier transform is reapplied to each of the symbol groups (630). Finally, the PAPR of the retransformed symbol groups is recalculated (640). In accordance with the present invention, determining whether the PAPR is below the predetermined value, readjusting the power and phase, retransforming the symbol groups and recalculating the PAPR is repeated until the PAPR of the retransformed symbol groups is below the predetermined value.

Figure 7:
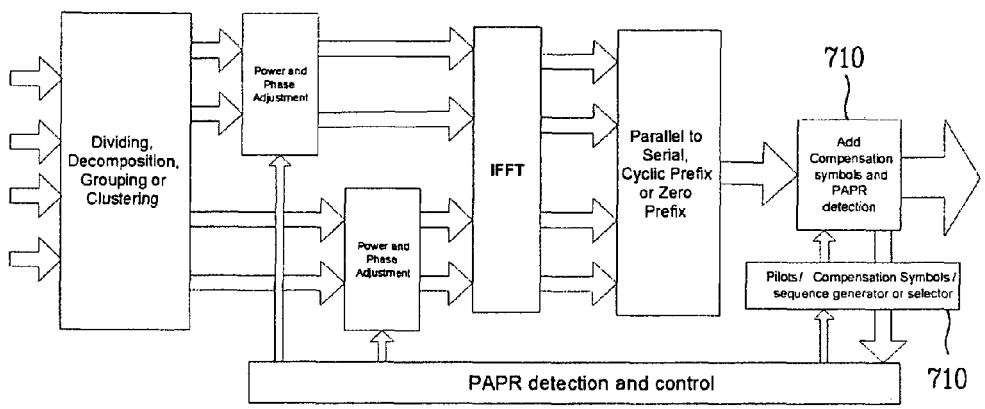
FIG. 7 illustrates a method for reducing PAPR of a signal with group-based signal adjustment in a frequency domain in accordance with another embodiment of the present invention.

FIG. 7 illustrates a method for reducing PAPR of a signal with group-based signal adjustment in a frequency domain in accordance with another embodiment of the present invention. Referring to FIG. 7, the method shown is similar to the method described with reference to FIG. 6. However, the method of FIG. 7 adds predefined symbols to at least one of the transformed symbol groups prior to calculating the PAPR of the symbol groups (710). Preferably, the predefined symbols may include pilots, a compensation symbol, and a sequence generator or selector, for example.

Figure 8:
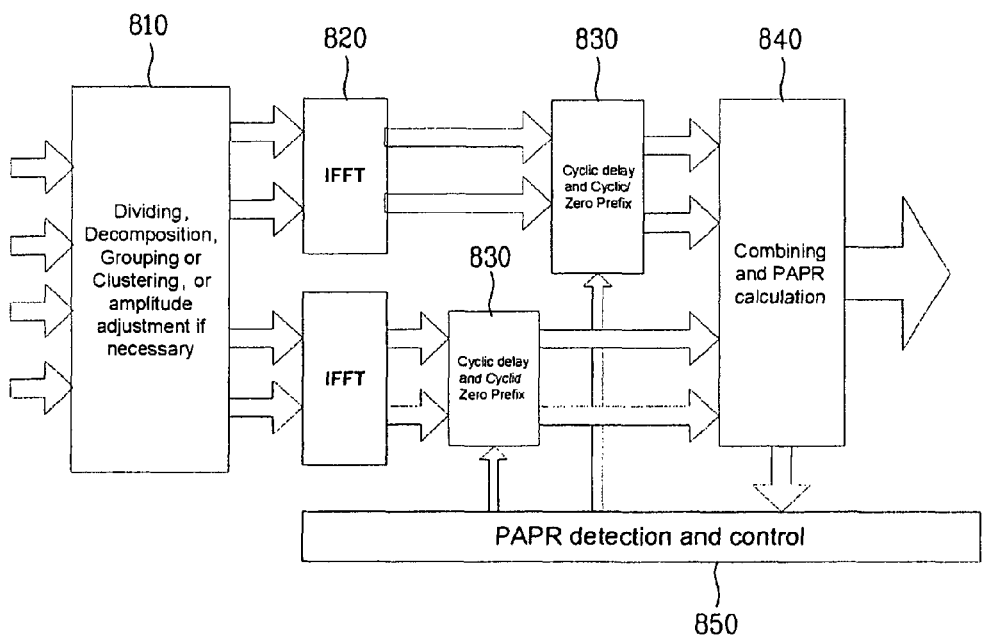
FIG. 8 illustrates a method for reducing PAPR of a signal with group-based cyclic delay in a time domain in accordance with one embodiment of the present invention.

FIG. 8 illustrates a method for reducing PAPR of a signal with group-based cyclic delay in a time domain in accordance with one embodiment of the present invention. Referring to FIG. 8, a data stream is modulated into a plurality of symbols. The plurality of symbols are then divided, decomposed, grouped or clustered into symbol groups (810). Amplitude adjustment may also be performed on the symbols if necessary. Thereafter, a Fourier transform (e.g., IFFT or IDFT) is applied to each of the symbol groups (820), and a cyclic delay may be applied to at least one of the transformed symbol groups (830). As a result, a peak to average power ratio (PAPR) of the symbol groups may be calculated (840). Furthermore according to preference, the transformed symbol groups may be combined prior to, or after, the PAPR of the symbol groups is calculated (840). Additionally, according to preference, the Fourier transform may be applied to the plurality of symbols prior to being divided, decomposed, grouped or clustered into symbol groups.

Still referring to FIG. 8, after calculating the PAPR of the symbol groups, it is determined whether the PAPR is below a predetermined value (850). If so, then a feedback operation of the method may not be necessary because the PAPR is below a threshold. However, if the PAPR of the symbol groups is not below the predetermined value, then the feedback operation will be performed to reduce the PAPR.

Preferably, upon the feedback operation being implemented, a delay is reapplied to at least one of the transformed symbol groups (830). Notably, a reapplied delay value may be different from an original delay value. Thereafter, all symbol groups are recombined and the PAPR of the recombined symbol groups is recalculated (840). In accordance with the present invention, determining whether the PAPR is below the predetermined value, reapplying the delay, recombining the symbol groups and recalculating the PAPR is repeated until the PAPR of the recombined symbol groups is below the predetermined value.

Figure 9:
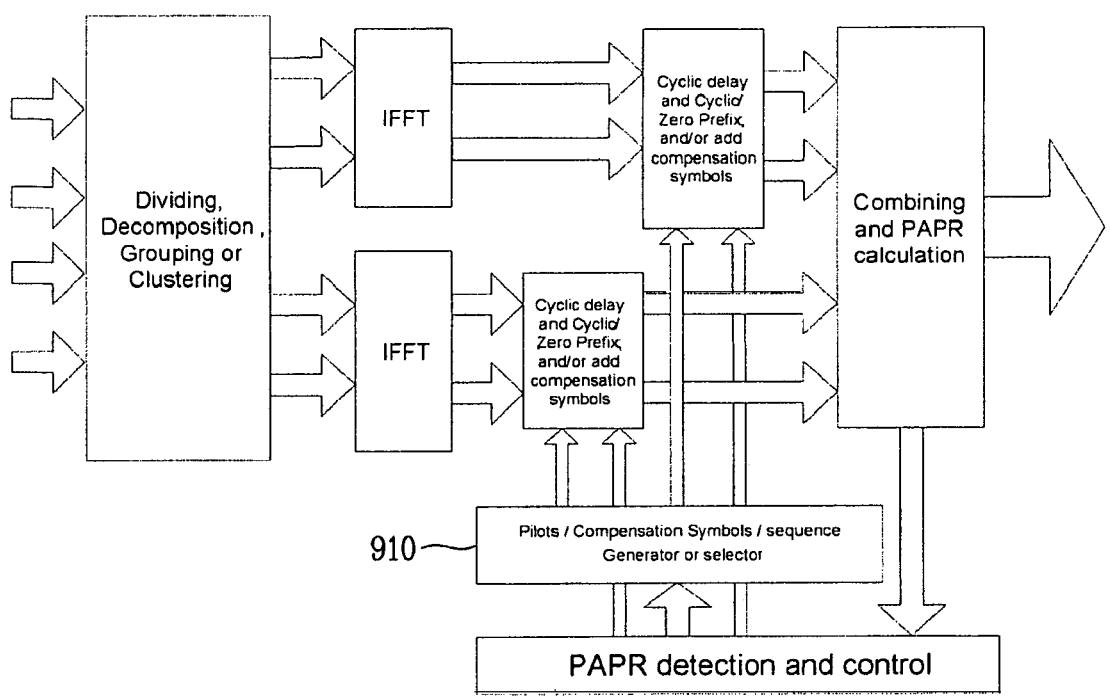
FIG. 9 illustrates a method for reducing PAPR of a signal with group-based cyclic delay in a time domain in accordance with another embodiment of the present invention.

FIG. 9 illustrates a method for reducing PAPR of a signal with group-based cyclic delay in a time domain in accordance with another embodiment of the present invention. Referring to FIG. 9, the method shown is similar to the method described with reference to FIG. 8. However, the method of FIG. 9 adds predefined symbols to at least one of the transformed symbol groups prior to applying the delay to at least one of the transformed symbol groups (910). Alternatively, predefined symbols may be added to at least one of the transformed symbol groups after applying the delay to at least one of the transformed symbol groups. Preferably, the predefined symbols may include pilots, a compensation symbol, and a sequence generator or selector, for example.

In accordance with the present invention, the methods described with respect to FIGS. 6-9 differ from the partial transmit signaling (PTS) method for reducing PAPR. For example, in the PTS method, the symbols of each group are Fourier transformed and then weighted in terms of phase and amplitude prior to combining and detecting the PAPR. With regard to FIGS. 6 and 7, the symbols of each group are first weighted and then Fourier transformed before being combined and the PAPR detected. With regard to FIGS. 8 and 9, the symbols of each group are Fourier transformed and then cyclic delayed prior to combining and PAPR detection. Accordingly, under the PTS method, weights information of each grouped is preferably transmitted to a receiver for demodulation. However, under the methods described with respect to FIGS. 6-9, the weights information is not necessarily transmitted to the receiver because it can be learned as part of a channel response.

The methods described with respect to FIGS. 7 and 9 also differ from the PTS method in that optional pilots or compensation symbols may be added to reduce the PAPR and help the receiver estimate the channel. Furthermore, a grouping/clustering/decomposition operation in FIGS. 6-9 is more general. For example, a whole group of input symbols can be directly partitioned into the sum of multiple subgroups of symbols. Also, higher-order modulated symbols may be decomposed into the sum of multiple lower-order modulated symbols.

Figure 10:
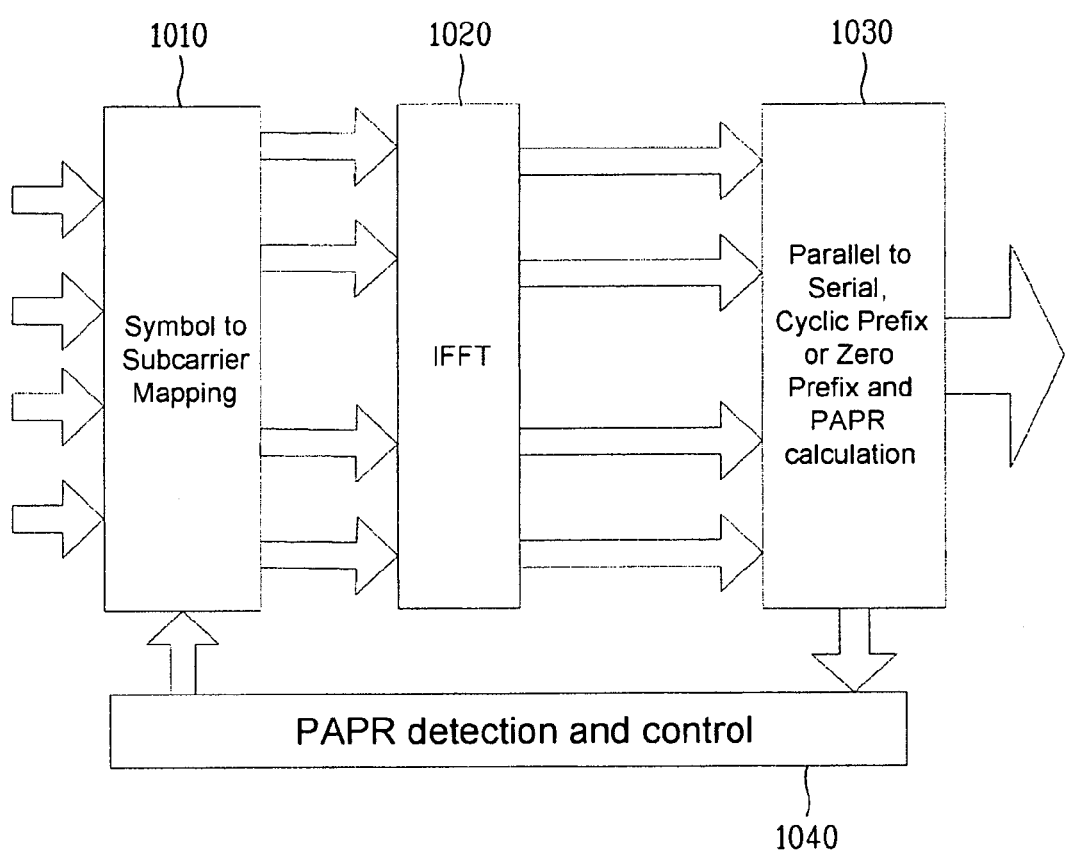
FIG. 10 illustrates a method for reducing PAPR of a signal with symbol-to-subcarrier remapping in accordance with one embodiment of the present invention.

FIG. 10 illustrates a method for reducing PAPR of a signal with symbol-to-subcarrier remapping in accordance with one embodiment of the present invention. Referring to FIG. 10, a data stream is modulated into a plurality of symbols. Each of the plurality of symbols are then mapped to an associated subcarrier (e.g., interleaving) (1010). Thereafter, a Fourier transform (e.g., IFFT or IDFT) is applied to each of the mapped symbols (1020). As a result, a peak to average power ratio (PAPR) of the transformed symbols may be calculated (1030).

Still referring to FIG. 10, after calculating the PAPR of the transformed symbols, it is determined whether the PAPR is below a predetermined value (1040). If so, then a feedback operation of the method may not be necessary because the PAPR is below a threshold. However, if the PAPR of the transformed symbols is not below the predetermined value, then the feedback operation will be performed to reduce the PAPR.

Preferably, upon the feedback operation being implemented, each of the plurality of symbols are then remapped to an associated subcarrier (1010). Thereafter, a Fourier transform is reapplied to each of the remapped symbols (1020). Thereafter, the PAPR of the retransformed symbols is recalculated (1030). In accordance with the present invention, determining whether the PAPR is below the predetermined value, remapping the symbols, retransforming the symbols and recalculating the PAPR is repeated until the PAPR of the retransformed symbols is below the predetermined value.

Figure 11:
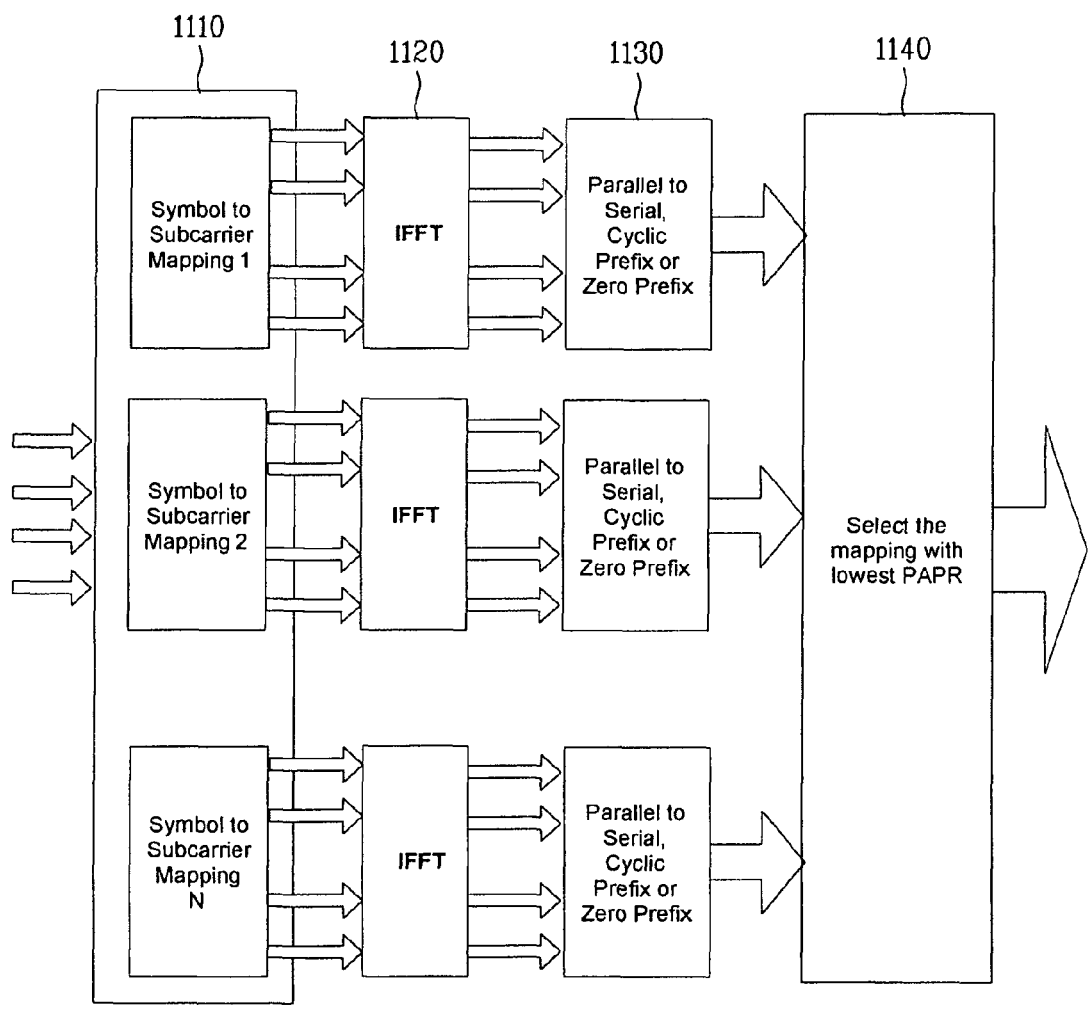
FIG. 11 illustrates a method for reducing PAPR of a signal with symbol-to-subcarrier remapping in accordance with another embodiment of the present invention.

FIG. 11 illustrates a method for reducing PAPR of a signal with symbol-to-subcarrier remapping in accordance with another embodiment of the present invention. Referring to FIG. 11, a data stream is modulated into a plurality of symbols similar to FIG. 10 above. However, in FIG. 11, instead of using only one mapping scheme, as in FIG. 10, to map each of the symbols to an associated subcarrier, a plurality of mapping schemes (e.g., 1, 2, . . . , N) are used (1110). Therefore, after mapping is performed, a plurality of symbol-to-subcarrier groups are generated representing N number of mapping schemes. Thereafter, a Fourier transform is applied to each of the symbol-to-subcarrier groups (1120), and a PAPR of each transformed symbol-to-subcarrier group may be calculated (1130). Finally, a symbol-to-subcarrier group is selected that achieves a predefined condition. For example, a symbol-to-subcarrier group may be selected if it is detected to have the lowest PAPR among the plurality of symbol-to-subcarrier groups (1140).

In accordance with another embodiment of the present invention, space-time block coding (STBC) may be used to reduce PAPR of a signal. STBC is a robust multiple input-multiple output (MIMO) scheme with maximum diversity. Compared with MIMO beamforming techniques, STBC has low transmitter complexity and low feedback requirements.

Alamouti space-time block coding is a simple open-loop orthogonal STBC and is preferably used with a two-transmit antenna system. The Alamouti STBC is a rate-1 code and has full diversity at a receiver side. The Alamouti STBC may be represented by Equation (2), wherein $s_1$ represents a first signal/symbol and $s_2$ represents a second signal/symbol.

$$C_{Alamouti}(s_1, s_2) = \begin{bmatrix} s_1 & s_2 \\ -s_2^* & s_1^* \end{bmatrix} \quad (2)$$

Under the Alamouti scheme, two signals may be transmitted in one block. To increase the rate of signal transmission, a high-rate STBC method may be implemented. Here, a symbol of the first signal $s_1$ may be transmitted with high power and a symbol of the second signal $s_2$ may be transmitted with low power. At a receiver side, the symbol transmitted with high power is decoded first. Thereafter, the symbol transmitted with low power can be decoded. Consequently, STBC transmission is made more efficient.

In accordance with the present invention, non-orthogonal STBC will be implemented, wherein two Alamouti STBCs are superimposed together with unitary matrix rotation and constellation rotation. This is preferable for high-rate applications with two transmission antennas, such as for uplink transmissions, for example. Accordingly, by implementing space-time block coding, the following advantages are realized: full rate transmission with high spectral efficiency, no channel quality information (CQI) feedback necessary, low transmitter complexity and low PAPR. Furthermore, with antenna selection, space-time block coding may be deployed for more that two transmission antenna applications for both uplink and downlink transmissions.

Figure 12:
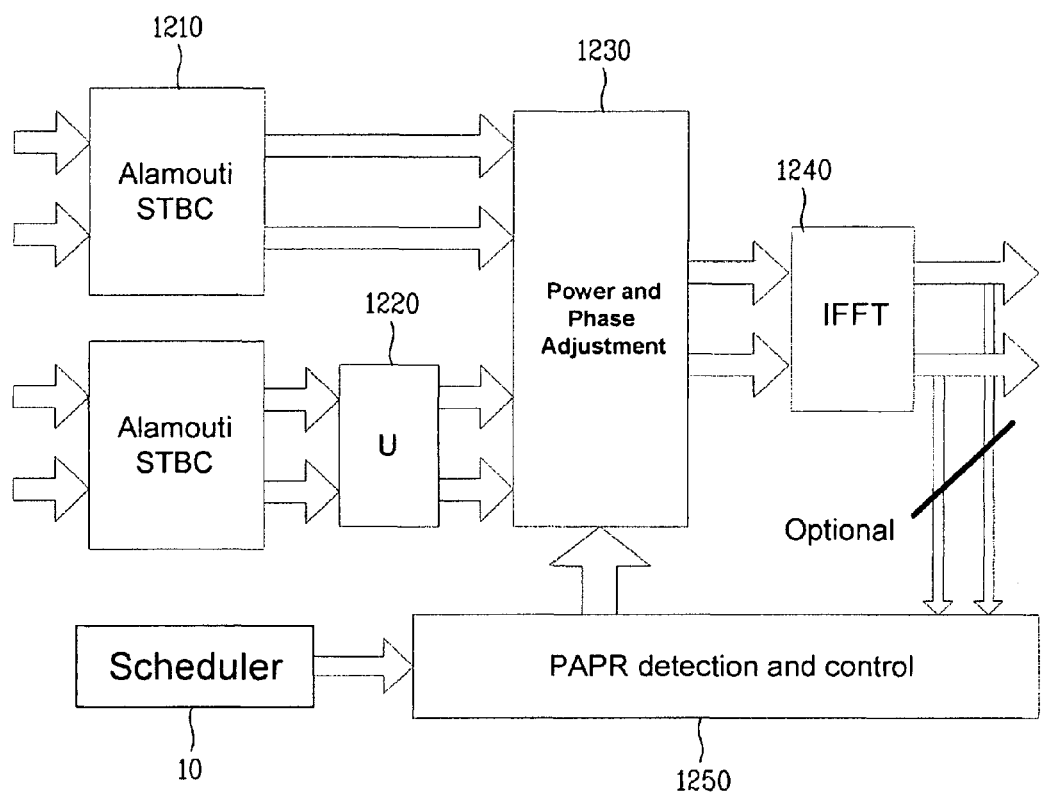
FIG. 12 illustrates a method for reducing PAPR of a signal with high-rate space-time block coding in accordance with one embodiment of the present invention.

FIG. 12 illustrates a method for reducing PAPR of a signal with high-rate space-time block coding in accordance with one embodiment of the present invention. Referring to FIG. 12, a data stream is modulated into a plurality of symbols. The plurality of symbols are then divided, decomposed, grouped or clustered into symbol groups. Thereafter, the plurality of symbol groups are block coded by Alamouti space-time block coding (STBC), for example (1210). At least one of the block coded symbol groups may then be adjusted for power and/or phase (1230). Thereafter, a Fourier transform (e.g., IFFT or IDFT) is applied to each of the block coded symbol groups (1240). As a result, a peak to average power ratio (PAPR) of the transformed block coded symbol groups may be calculated.

In accordance with the present invention, at least one block coded symbol group may be differentiated from another block coded symbol group prior to adjusting the power and/or phase of the at least one block coded symbol group. The differentiation may be performed by applying a unitary matrix (U) to the at least one block coded symbol group (1220). Alternatively, additional block coding may be applied to the at least one block coded symbol group to differentiate the symbol group.

Still referring to FIG. 12, after calculating the PAPR of the transformed block coded symbol groups, it may be determined whether the PAPR is below a predetermined value (1250). If so, then a feedback operation of the method may not be necessary because the PAPR is below a threshold. However, if the PAPR of the transformed block coded symbol groups is not below the predetermined value, then the feedback operation will be performed to reduce the PAPR.

Preferably, upon the feedback operation being implemented, power and/or phase of at least one block coded symbol group is readjusted (1230). A Fourier transform is then reapplied to the block coded symbol groups (1240). Thereafter, the PAPR of the retransformed block coded symbol groups is recalculated. In accordance with the present invention, determining whether the PAPR is below the predetermined value, readjusting the power and/or phase, retransforming the block coded symbol groups and recalculating the PAPR is repeated until the PAPR of the retransformed block coded symbol groups is below the predetermined value.

The method of FIG. 12 may be represented by Equation (3), wherein $A_1$ and $A_2$ are signal amplitudes of two layers, U is a 2×2 unitary matrix with $UU^H=I$, and $\theta$ is a constellation rotation angle of a second layer.

$$C(s_1, s_2, s_3, s_4; A_1, A_2, \theta) = \quad (3)$$
$$A_1 C_{Alamouti}(s_1, s_2) + A_2 U \cdot C_{Alamouti}(s_3 e^{j\theta}, s_4 e^{j\theta}) =$$
$$A_1 \begin{bmatrix} s_1 & s_2 \\ -s_2^* & s_1^* \end{bmatrix} + A_2 U \begin{bmatrix} s_3 e^{j\theta} & s_4 e^{j\theta} \\ -s_4^* e^{-j\theta} & s_3^* e^{-j\theta} \end{bmatrix}$$

Figure 13:
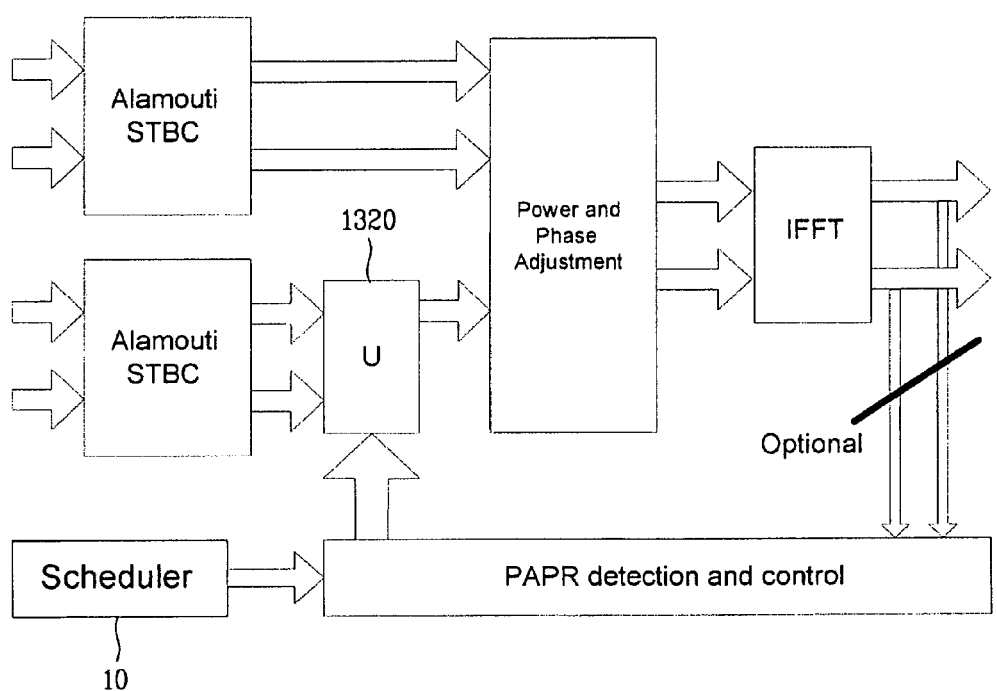
FIG. 13 illustrates a method for reducing PAPR of a signal with high-rate space-time block coding in accordance with another embodiment of the present invention.

FIG. 13 illustrates a method for reducing PAPR of a signal with high-rate space-time block coding in accordance with another embodiment of the present invention. Referring to FIG. 13, the method shown is similar to the method described with reference to FIG. 12. However, the method of FIG. 13 differs when the feedback operation is performed.

Specifically, upon the feedback operation being implemented, at least one block coded symbol group may be redifferentiated from another block coded symbol group by applying an adjusted unitary matrix (U) or additional block coding (1320). Thereafter, the method proceeds in order to recalculate the PAPR of the retransformed block coded symbol groups.

The method of FIG. 13 may be represented by Equation (4), wherein $A_1$ and $A_2$ are signal amplitudes of two layers, U is a 2×2 unitary matrix with $UU^H=I$, which is a function of $\theta$. For example, U is $U=U_0 e^{j\theta}$.

$$C(s_1, s_2, s_3, s_4; A_1, A_2, \theta) = \quad (4)$$
$$A_1 C_{Alamouti}(s_1, s_2) + A_2 U(\theta) \cdot C_{Alamouti}(s_3, s_4) =$$
$$A_1 \begin{bmatrix} s_1 & s_2 \\ -s_2^* & s_1^* \end{bmatrix} + A_2 U(\theta) \begin{bmatrix} s_3 & s_4 \\ -s_4^* & s_3^* \end{bmatrix}$$

Figure 14:
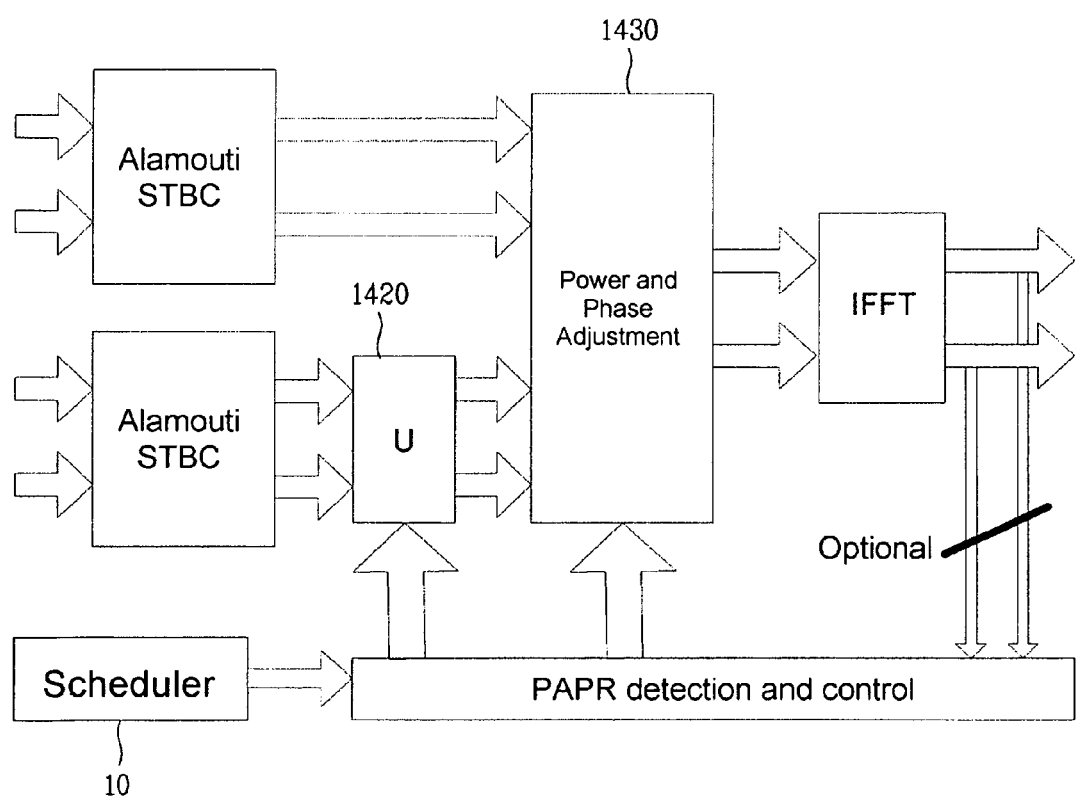
FIG. 14 illustrates a method for reducing PAPR of a signal with high-rate space-time block coding in accordance with another embodiment of the present invention.

FIG. 14 illustrates a method for reducing PAPR of a signal with high-rate space-time block coding in accordance with another embodiment of the present invention. Referring to FIG. 14, the method shown is similar to the method described with reference to FIG. 12. However, the method of FIG. 14 differs when the feedback operation is performed.

Specifically, upon the feedback operation being implemented, at least one block coded symbol group may be redifferentiated from another block coded symbol group by applying an adjusted unitary matrix (U) or additional block coding (1420). Furthermore, power and/or phase of at least one block coded symbol group may be readjusted (1430). Thereafter, the method proceeds in order to recalculate the PAPR of the retransformed block coded symbol groups.

The method of FIG. 14 may be represented by Equation (5), wherein $A_1$ and $A_2$ are signal amplitudes of two layers, U is a 2×2 unitary matrix with $UU^H=I$, which is a function of $\theta_1$, and $\theta_1$ and $\theta_2$ are a rotation angle of a second layer. For example, U is $U=U_0 e^{j\theta}$.

$$C(s_1, s_2, s_3, s_4; A_1, A_2, \theta_1, \theta_2) = \quad (5)$$
$$A_1 C_{Alamouti}(s_1, s_2) + A_2 U(\theta_1) \cdot C_{Alamouti}(s_3 e^{j\theta_2}, s_4 e^{j\theta_2}) =$$
$$A_1 \begin{bmatrix} s_1 & s_2 \\ -s_2^* & s_1^* \end{bmatrix} + A_2 U(\theta_1) \begin{bmatrix} s_3 e^{j\theta_2} & s_4 e^{j\theta_2} \\ -s_4^* e^{-j\theta_2} & s_3^* e^{-j\theta_2} \end{bmatrix}$$

Figure 15:
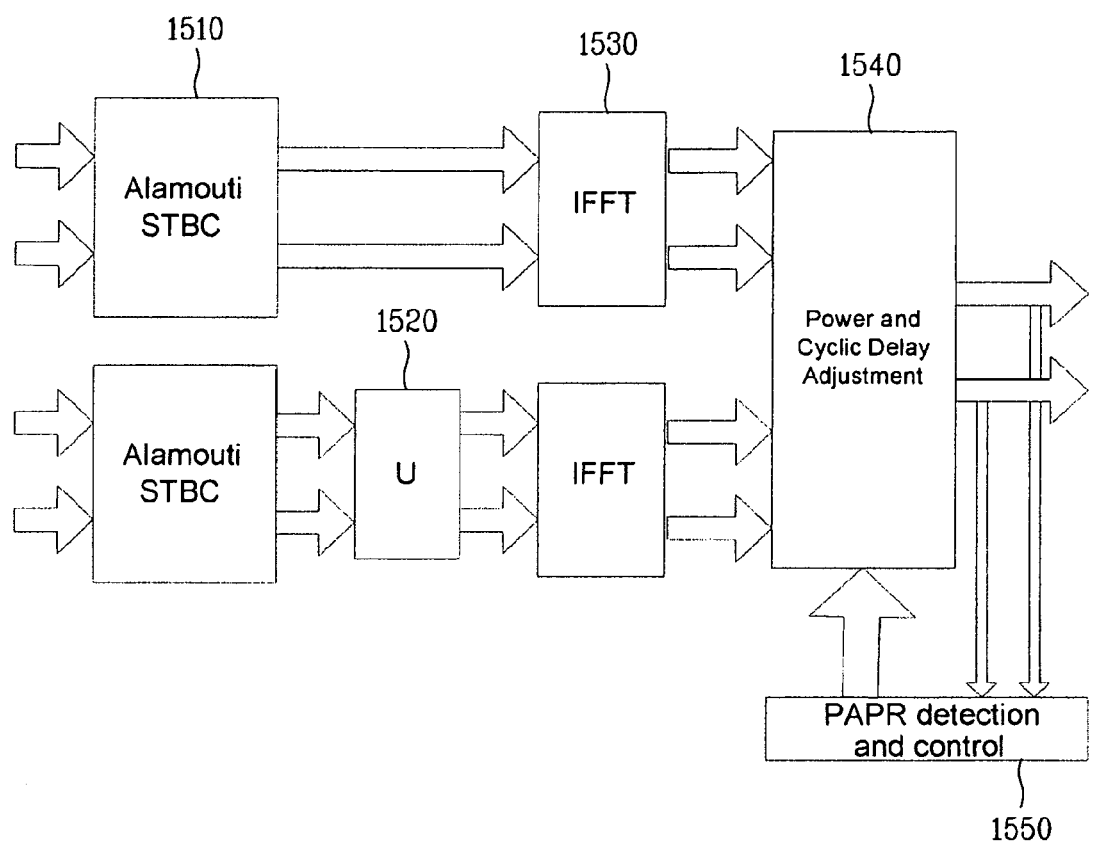
FIG. 15 illustrates a method for reducing PAPR of a signal with high-rate space-time block coding in accordance with another embodiment of the present invention.

FIG. 15 illustrates a method for reducing PAPR of a signal with high-rate space-time block coding in accordance with another embodiment of the present invention. Referring to FIG. 15, a data stream is modulated into a plurality of symbols. The plurality of symbols are then divided, decomposed, grouped or clustered into symbol groups. Thereafter, the plurality of symbol groups are block coded by Alamouti space-time block coding (STBC), for example (1510). A Fourier transform (e.g., IFFT or IDFT) is then applied to each of the block coded symbol groups. Thereafter, at least one of the transformed block coded symbol groups may be adjusted for power and/or cyclic delay (1540). As a result, a peak to average power ratio (PAPR) of the transformed block coded symbol groups may be calculated.

In accordance with the present invention, at least one block coded symbol group may be differentiated from another block coded symbol group prior to being transformed. The differentiation may be performed by applying a unitary matrix (U) to the at least one block coded symbol group (1520). Alternatively, additional block coding may be applied to the at least one block coded symbol group to differentiate the symbol group.

Still referring to FIG. 15, after calculating the PAPR of the transformed block coded symbol groups, it is determined whether the PAPR is below a predetermined value (1550). If so, then a feedback operation of the method may not be necessary because the PAPR is below a threshold. However, if the PAPR of the transformed block coded symbol groups is not below the predetermined value, then the feedback operation will be performed to reduce the PAPR.

Preferably, upon the feedback operation being implemented, power and/or cyclic delay of at least one transformed block coded symbol group is readjusted (1540). Thereafter, the PAPR of the transformed block coded symbol groups is recalculated. In accordance with the present invention, determining whether the PAPR is below the predetermined value, readjusting the power and/or cyclic delay and recalculating the PAPR is repeated until the PAPR of the transformed block coded symbol groups is below the predetermined value.

In accordance with the embodiments related to FIGS. 12-15, power allocation between layers can be decided by a scheduler 10 and the request of a receiver, such as a mobile terminal. Phase adjustment and power allocation may also be done together to lower PAPR of a transmission. Phase information can be decided by a power/phase control block with inputs from a scheduler, and optionally a Fourier transform output or feedback from a receiver. In accordance with the present invention, an example of U, which minimizes the union bound of pairwised error probabilities at EB/N0=10 dB, is represented by Equation (6).

$$U = \begin{bmatrix} e^{j\frac{7\pi}{20}}\cos\left(\frac{9\pi}{50}\right) & -e^{j\frac{\pi}{4}}\sin\left(\frac{9\pi}{50}\right) \\ -e^{-j\frac{\pi}{4}}\sin\left(\frac{9\pi}{50}\right) & -e^{-j\frac{7\pi}{20}}\cos\left(\frac{9\pi}{50}\right) \end{bmatrix} \quad (6)$$

Accordingly, the methods of the present invention related to FIGS. 12-15 provide a high-rate STBC scheme with PAPR reduction. Specifically, the present invention achieves high throughput via full-rate STBC, lower transmitter design constraint via PAPR reduction and simple transceiver chain design due to open-loop operation. The present invention is preferable for uplink high-rate transmission, where transmitter complexity of a mobile terminal is a major concern. The present invention may also be used for downlink transmission and further enhanced with antenna selection.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMB. The present invention is also applicable to other wireless communication systems using different air interfaces and/or physical layers, for example, UMTS, TDMA, CDMA including 1xEV-DO, FDMA, WCDMA including HSDPA, HSUPA, and beyond, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for reducing a peak to average power ratio of a signal in a wireless communication system, the method comprising:
   modulating a data stream into a plurality of symbols;
   dividing the plurality of symbols into symbol groups;
   applying a Fourier transform to each of the symbol groups;
   optionally applying a delay to at least one of the transformed symbol groups;
   calculating a peak to average power ratio of the symbol groups;
   determining whether the peak to average power ratio of the symbol groups is below a predetermined value;
   reapplying a delay to at least one of the transformed symbol groups if the peak to average power ratio of the symbol groups is not below the predetermined value;
   recombining all symbol groups; and
   recalculating the peak to average power ratio of the recombined symbol groups,
   wherein the determining, reapplying, recombining and recalculating steps are repeated until the peak to average power ratio of the recombined symbol groups is below the predetermined value or a minimum possible peak to average power ratio value is obtained.

2. The method of claim 1, further comprising combining the symbol groups prior to calculating the peak to average power ratio of the symbol groups.

3. The method of claim 1, further comprising combining the symbol groups after calculating the peak to average power ratio of the symbol groups.

4. The method of claim 1, wherein the delay is a cyclic delay.

5. The method of claim 1, wherein the delay reapplied to at least one transformed symbol group comprises a delay value different from an original delay value.

6. The method of claim 1, further comprising adding predefined symbols to at least one of the transformed symbol groups prior to applying the delay to at least one of the transformed symbol groups.

7. The method of claim 1, further comprising adding predefined symbols to at least one of the transformed symbol groups after applying the delay to at least one of the transformed symbol groups.

8. The method of claim 1, further comprising power and phase adjusting each of the symbol groups prior to transforming each of the symbol groups.

9. A method for reducing a peak to average power ratio of a signal in a wireless communication system, the method comprising:
   modulating a data stream into a plurality of symbols;
   dividing the plurality of symbols into symbol groups;
   block coding each of the symbol groups;
   adjusting a power of at least one of the block coded symbol groups;
   differing a phase of at least one of the block coded symbol groups prior to applying a Fourier transform to the block coded symbol groups;
   applying the Fourier transform to the block coded symbol groups; and
   calculating a peak to average power ratio of the transformed block coded symbol groups.

10. The method of claim 9, further comprising differentiating at least one of the block coded symbol groups from another of the block coded symbol groups prior to adjusting the power of the at least one of the block coded symbol groups.

11. The method of claim 10, wherein the differentiating comprises:
   applying a different type of block coding to each of the symbol groups; or
   applying additional block coding to at least one of the block coded symbol groups.

12. The method of claim 9, further comprising:
   determining whether the peak to average power ratio is below a predetermined value;
   re-adjusting the power of the at least one block coded symbol group if the peak to average power ratio is not below the predetermined value;
   reapplying the Fourier transform to the block coded symbol groups; and
   recalculating the peak to average power ratio of the retransformed blocked coded symbol groups,
   wherein the determining, re-adjusting, retransforming and recalculating steps are repeated until the peak to average power ratio of the retransformed coded symbol groups is below the predetermined value.

13. The method of claim 9, wherein block coding each of the symbol groups comprises block coding each of the symbol groups using an Alamouti scheme.

14. A method for reducing a peak to average power ratio of a signal in a wireless communication system, the method comprising:
- modulating a data stream into a plurality of symbols;
- applying a Fourier transform to the plurality of symbols;
- dividing the transformed plurality of symbols into symbol groups;
- optionally applying a delay to at least one of the transformed symbol groups;
- calculating a peak to average power ratio of the symbol groups;
- determining whether the peak to average power ratio of the symbol groups is below a predetermined value;
- reapplying a delay to at least one of the transformed symbol groups if the peak to average power ratio of the symbol groups is not below the predetermined value;
- recombining all symbol groups; and
- recalculating the peak to average power ratio of the recombined symbol groups,
- wherein the determining, reapplying, recombining and recalculating steps are repeated until the peak to average power ratio of the recombined symbol groups is below the predetermined value or a minimum possible peak to average power ratio value is obtained.

* * * * *